(12) United States Patent
Ueno et al.

(10) Patent No.: US 12,009,476 B2
(45) Date of Patent: Jun. 11, 2024

(54) SOLID ELECTROLYTE MATERIAL AND BATTERY USING SAME

(71) Applicant: Panasonic Intellectual Property Management Co., Ltd., Osaka (JP)

(72) Inventors: Koki Ueno, Osaka (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 484 days.

(21) Appl. No.: 17/471,767

(22) Filed: Sep. 10, 2021

(65) Prior Publication Data

US 2021/0408586 A1    Dec. 30, 2021

Related U.S. Application Data

(63) Continuation of application No. PCT/JP2019/048207, filed on Dec. 10, 2019.

(30) Foreign Application Priority Data

Mar. 26, 2019 (JP) ................................. 2019-058334

(51) Int. Cl.
*H01M 10/0562* (2010.01)
*H01M 4/04* (2006.01)
*H01M 10/0525* (2010.01)

(52) U.S. Cl.
CPC ..... *H01M 10/0562* (2013.01); *H01M 4/0407* (2013.01); *H01M 10/0525* (2013.01); *C01P 2002/32* (2013.01); *H01M 2300/0068* (2013.01); *H01M 2300/008* (2013.01)

(58) Field of Classification Search
CPC . H01M 2300/0065; H01M 2300/0068; H01M 2300/0071; H01M 2300/0074; H01M 2300/008; H01M 2300/0088; H01M 2300/0091; H01M 2300/0094; H01M 10/0562; C01P 2002/32
See application file for complete search history.

(56) References Cited

U.S. PATENT DOCUMENTS

2012/0301796 A1    11/2012   Ohtomo et al.

FOREIGN PATENT DOCUMENTS

JP       2011-129312       6/2011

OTHER PUBLICATIONS

O'Rourke et al., "Interfacial strain effects on lithium diffusion pathways in the spinel solid electrolyte Li-doped MgAl2O4," Apr. 17, 2018, Physical Review Materials, 2, 045403. (Year: 2018).*

(Continued)

*Primary Examiner* — Matthew W Van Oudenaren
(74) *Attorney, Agent, or Firm* — Greenblum & Bernstein, P.L.C.

(57) ABSTRACT

The present disclosure provides a solid electrolyte material having high lithium ion conductivity. The solid electrolyte material of the present disclosure includes Li, M1, M2 and X, and has a spinel structure. M1 is at least one element selected from the group consisting of Mg and Zn. M2 is at least one element selected from the group consisting of Al, Ga, Y, In and Bi. X is at least one element selected from the group consisting of F, Cl, Br and I.

6 Claims, 4 Drawing Sheets

(56) References Cited

OTHER PUBLICATIONS

Kanno et al., Ionic Conductivity and Phase Transition of the Spinel System Li(2-2x)M(1+x)Cl4(M=Mg, Mn,Cd), 1984, J. Electrochem. Soc. 131, 469. (Year: 1984).*
International Search Report of PCT application No. PCT/JP2019/048207 dated Mar. 3, 2020.
Ryoji Kanno et al., "Ionic Conductivity and Phase Transition of the Spinel System Li2—2xM1+xCl4 (M=Mg, Mn, Cd)", Journal of the Electrochemical Society, vol. 131, No. 3, Jan. 1984, pp. 469-474.
Office Action for IN App. No. 202147041534, dated Jun. 7, 2023.
Put et al., "Characterization of thin films of the solid electrolyte Li(x)Mg(1-2x)Al(2+x)O(4) (x=0, 0.05, 0.15, 0.25)", Phys Chem Chem Phys, 17:29045-29056 (2015), DOI: 10.1039/c5cp03916a (abstract only).
Lutz et al., "Ionic motion of tetrahedrally and octahedrally coordinated lithium ions in ternary and quaternary halides" Solid State Ionics, vols. 28-30, Part 2, Sep. 1988, pp. 1282-1286, doi: 10.1016/0167-2738(88)90371-2 (abstract only).

\* cited by examiner

SOLID ELECTROLYTE MATERIAL AND BATTERY USING SAME

BACKGROUND

1. Technical Field

The present disclosure relates to a solid electrolyte material and a battery using the same.

2. Description of the Related Art

Japanese Unexamined Patent Application Publication No. 2011-129312 (Patent Literature 1) discloses an all-solid-state battery using a sulfide solid electrolyte material.

Kanno R, Takeda Y, Takeda K and Yamamoto O, 1984 J. Electrochem. Soc., 131, 469-74 (Non Patent Literature 1) discloses a halide solid electrolyte having a spinel structure.

SUMMARY

One non-limiting and exemplary embodiment provides a solid electrolyte material having high lithium ion conductivity.

In one general aspect, the techniques disclosed here feature a solid electrolyte material including Li, M1, M2 and X, wherein M1 is at least one element selected from the group consisting of Mg and Zn, M2 is at least one element selected from the group consisting of Al, Ga, Y, In and Bi, X is at least one element selected from the group consisting of F, Cl, Br and I, and the solid electrolyte material has a spinel structure.

The solid electrolyte material provided according to the present disclosure has high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
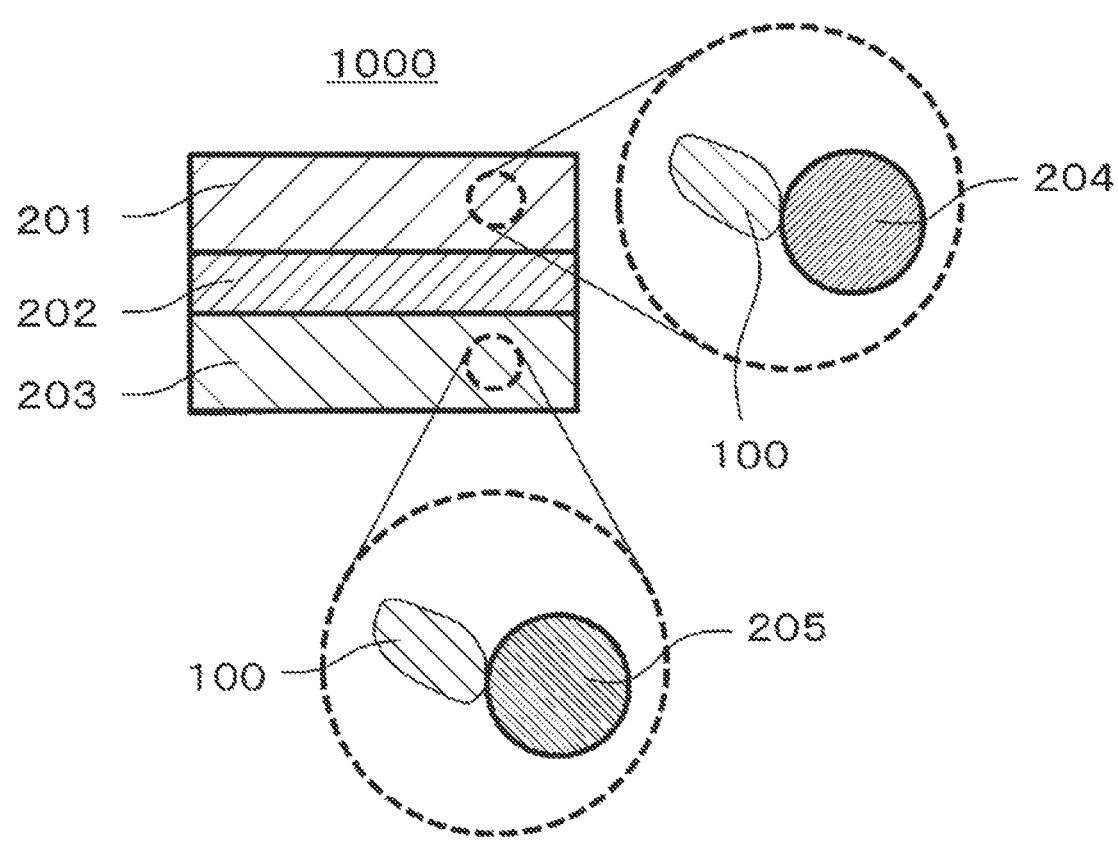
FIG. 1 illustrates a sectional view of a battery 1000 according to a second embodiment.

Embodiments of the present disclosure will be described hereinbelow with reference to the drawings.

First Embodiment

A solid electrolyte material according to a first embodiment includes Li, M1, M2 and X, and has a spinel structure. M1 is at least one element selected from the group consisting of Mg and Zn. M2 is at least one element selected from the group consisting of Al, Ga, Y, In and Bi. X is at least one element selected from the group consisting of F, Cl, Br and I.

The solid electrolyte material according to the first embodiment has high lithium ion conductivity. Thus, the solid electrolyte material according to the first embodiment may be used to obtain a battery having excellent charge/discharge characteristics. An example of such batteries is an all-solid-state secondary battery.

The solid electrolyte material according to the first embodiment does not contain sulfur and therefore does not generate hydrogen sulfide even when exposed to the atmosphere. Thus, the solid electrolyte material according to the first embodiment is highly safe.

The solid electrolyte material according to the first embodiment may contain an element that is inevitably mixed. Examples of such elements include hydrogen, nitrogen and oxygen. Such elements may be present in powders of raw materials of the solid electrolyte material or in the atmosphere in which the solid electrolyte material is produced or stored.

M1 is at least one element selected from the group consisting of Mg and Zn. As a result of this, the solid electrolyte material according to the first embodiment may have a spinal structure. Thus, the solid electrolyte material according to the first embodiment attains high ion conductivity and high stability as described in Non Patent Literature 1.

In solid electrolyte materials having lithium ion conductivity, it is desirable that the number of anions coordinated to a lithium ion (for example, X in the solid electrolyte material according to the first embodiment) be small. The reason for this is as follows.

In order for a lithium ion to be conducted, the bonds between the lithium ion and the anions that are adjacent to the lithium ion have to be broken. The smaller the energy for breaking the bonds, the more easily the lithium ions are conducted. Lithium ions coordinated with a smaller number of anions have less bonds that are to be broken, and thus the bonds are broken with a smaller amount of energy. As a result, the lithium ions are conducted more easily. In crystals containing lithium ions, the number of anions coordinated to the lithium ion is generally 4 or 6. In spinel structures, the number of anions coordinated to a lithium ion is dominantly 4 and thus high lithium ion conductivity can be realized.

M1 may be Mg or Zn, or may include both Mg and Zn because Mg and Zn can both form a spinel structure. Further, Mg and Zn are inexpensive elements. Thus, the use of Mg and Zn may reduce the cost of the solid electrolyte material.

M2 may be a single element or may be two or more kinds of elements. M2 is at least one element selected from the group consisting of Al, Ga, Y, In and Bi. Specifically, M2 is a trivalent or pentavalent metal element(s). Because M2 has a higher valence than M1, Li vacancies may be produced in the solid electrolyte material according to the first embodiment. As a result, the solid electrolyte material may attain enhanced ion conductivity. The reasons for this will be described below.

M2 mainly substitutes M1 sites. Here, the introduction of M2 having a higher valence than M1 destroys electrically neutral conditions in the solid electrolyte material. As a result, Li vacancies may be produced. In order for a lithium ion to be conducted, it is desirable that the site to which the ion will be conducted next be empty. This situation may be created by Li vacancies. Thus, the ion conductivity of the solid electrolyte material is enhanced by virtue of M2 being an element having a higher valence than M1.

To enhance the ion conductivity of the solid electrolyte material, the solid electrolyte material according to the first embodiment may be a material represented by the following compositional formula (1).

$$Li_{2-a}M1_{1-a}M2_{a}X_{4} \quad (1)$$

Here, 0<a<1.

To enhance the ion conductivity of the solid electrolyte material, the letter a in the compositional formula (1) may satisfy 0.05≤a≤0.6. From the point of view of ion conductivity, the letter a may desirably satisfy 0.1≤a≤0.4. From the point of view of ion conductivity, the letter a may more desirably satisfy 0.2≤a≤0.4.

By increasing the amount of substitution by M2 relative to M1, that is, by increasing the value of a in the compositional formula (1), more Li vacancies may be produced. As a result, the ion conductivity of the solid electrolyte material is enhanced.

To further enhance the ion conductivity of the solid electrolyte material, X may be at least one element selected from the group consisting of Cl, Br and I.

The electronegativity of X is influential to the lithium ion conductivity. The bonds between Li and X are stronger and are more difficult to break with increasing difference in electronegativity between Li and X. Thus, in order to enhance the lithium ion conductivity, X may be at least one element selected from the group consisting of Cl, Br and I each having a relatively small electronegativity.

The shape of the solid electrolyte material according to the first embodiment is not limited. For example, the shape is acicular, spherical or elliptical spherical. The solid electrolyte material according to the first embodiment may be in the form of particles. The solid electrolyte material according to the first embodiment may be formed so as to have a pellet or plate shape.

When the solid electrolyte material according to the first embodiment is particles (for example, spheres), the solid electrolyte material may have a median diameter of greater than or equal to 0.1 μm and less than or equal to 100 μm, desirably greater than or equal to 0.5 μm and less than or equal to 10 μm. With this configuration, the solid electrolyte material according to the first embodiment attains higher ion conductivity. Further, such a solid electrolyte material according to the first embodiment may be well dispersed with other materials. The median diameter means the particle size at 50% cumulative volume in the volume-based particle size distribution. The volume-based particle size distribution may be measured with a laser diffraction measuring device or an image analyzer.

To ensure that the solid electrolyte material according to the first embodiment and an active material will be well dispersed, the solid electrolyte material according to the first embodiment may have a median diameter smaller than that of the active material.

Next, a method for producing the solid electrolyte material according to the first embodiment will be described.

For example, the solid electrolyte material according to the first embodiment is produced by the following method.

Powders of halides as raw materials are mixed together so that the mixture has the desired composition. The raw materials are not limited to powders and may be granules or liquids.

When, for example, the material to be produced is $Li_{1.9}Mg_{0.9}Al_{0.1}Cl_{4}$, a LiCl raw material powder, a $MgCl_{2}$ raw material powder and an $AlCl_{3}$ raw material powder are mixed in a $LiCl:MgCl_{2}:AlCl_{3}$ molar ratio of 1.9:0.9:0.1. The raw material powders may be mixed in a molar ratio precontrolled so as to offset any compositional changes that may occur during the synthesis process.

The raw material powders are reacted together mechanochemically (that is, using a mechanochemical milling method) in a mixing device such as a planetary ball mill to give a reaction product. The reaction product may be heat-treated in vacuum or in an inert atmosphere. Alternatively, the mixture of the raw material powders may be heat-treated in vacuum or in an inert atmosphere. For example, the heat treatment may be performed at a temperature higher than or equal to 100° C. and lower than or equal to 400° C. for 1 or more hours.

In order to suppress compositional changes that may occur during the heat treatment process, the raw material powders may be sealed in a closed container such as a quartz tube and such raw material powders may be heat-treated.

The solid electrolyte material according to the first embodiment may be obtained by the method described above.

Second Embodiment

A second embodiment will be described below. The features described in the first embodiment will be omitted as appropriate.

A battery according to the second embodiment includes a positive electrode, an electrolyte layer and a negative electrode. The electrolyte layer is disposed between the positive electrode and the negative electrode.

At least one selected from the group consisting of the positive electrode, the electrolyte layer and the negative electrode includes the solid electrolyte material according to the first embodiment.

The battery according to the second embodiment attains high charge/discharge characteristics by virtue of its containing the solid electrolyte material according to the first embodiment.

A specific example of the batteries according to the second embodiment will be described hereinbelow.

FIG. 1 illustrates a sectional view of a battery 1000 according to the second embodiment.

The battery 1000 includes a positive electrode 201, an electrolyte layer 202 and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 includes an electrolyte material (for example, a solid electrolyte material).

The negative electrode 203 includes negative electrode active material particles 205 and solid electrolyte particles 100.

The solid electrolyte particles 100 are particles containing the solid electrolyte material according to the first embodiment as a principal component. The phrase that the particles contain the solid electrolyte material according to the first embodiment as a principal component means that the solid electrolyte material according to the first embodiment represents the largest proportion among the components contained in the particles. The solid electrolyte particles 100 may be particles made of the solid electrolyte material according to the first embodiment.

The positive electrode 201 includes a material capable of storing and releasing metal ions (for example, lithium ions).

The material is, for example, a positive electrode active material (for example, the positive electrode active material particles 204).

Examples of the positive electrode active materials include lithium-containing transition metal oxides, transition metal fluorides, polyanionic materials, fluorinated polyanionic materials, transition metal sulfides, transition metal oxyfluorides, transition metal oxysulfides and transition metal oxynitrides. Examples of the lithium-containing transition metal oxides include $Li(NiCoAl)O_2$ and $LiCoO_2$.

The positive electrode active material particles 204 may have a median diameter of greater than or equal to 0.1 μm and less than or equal to 100 μm. When the positive electrode active material particles 204 have a median diameter of greater than or equal to 0.1 μm, the positive electrode active material particles 204 and the solid electrolyte particles 100 may be well dispersed in the positive electrode 201. As a result, the charge/discharge characteristics of the battery are enhanced. When the positive electrode active material particles 204 have a median diameter of less than or equal to 100 μm, the lithium diffusion rate in the positive electrode active material particles 204 is enhanced. Consequently, the battery may be operated at a high output.

The positive electrode active material particles 204 may have a median diameter larger than that of the solid electrolyte particles 100. With this configuration, the positive electrode active material particles 204 and the solid electrolyte particles 100 may be well dispersed.

From the points of view of the energy density and output of the battery, the ratio of the volume of the positive electrode active material particles 204 to the total of the volume of the positive electrode active material particles 204 and the volume of the solid electrolyte particles 100 in the positive electrode 201 may be greater than or equal to 0.30 and less than or equal to 0.95.

From the points of view of the energy density and output of the battery, the positive electrode 201 may have a thickness of greater than or equal to 10 μm and less than or equal to 500 μm.

The electrolyte layer 202 includes an electrolyte material. The electrolyte material is, for example, a solid electrolyte material. The electrolyte layer 202 may include the solid electrolyte material according to the first embodiment.

The electrolyte layer 202 may be composed solely of the solid electrolyte material according to the first embodiment.

The electrolyte layer 202 may be composed solely of a solid electrolyte material distinct from the solid electrolyte material according to the first embodiment. Examples of the solid electrolyte materials distinct from the solid electrolyte materials according to the first embodiment include $Li_2MgX'_4$, $Li_2FeX'_4$, $Li(Al, Ga, In)X'_4$, $Li_3(Al, Ga, In)X'_6$ and LiI. Here, X' is at least one element selected from the group consisting of F, Cl, Br and I.

Hereinafter, the solid electrolyte material according to the first embodiment will be written as the first solid electrolyte material. The solid electrolyte material distinct from the solid electrolyte material according to the first embodiment will be written as the second solid electrolyte material.

The electrolyte layer 202 may include not only the first solid electrolyte material but also the second solid electrolyte material. The first solid electrolyte material and the second solid electrolyte material may be uniformly dispersed.

A layer made of the first solid electrolyte material and a layer made of the second solid electrolyte material may be stacked along the stacking direction of the battery 1000.

The electrolyte layer 202 may have a thickness of greater than or equal to 1 μm and less than or equal to 100 μm. When the electrolyte layer 202 has a thickness of greater than or equal to 1 μm, the positive electrode 201 and the negative electrode 203 are unlikely to be short-circuited. When the electrolyte layer 202 has a thickness of less than or equal to 100 μm, the battery may be operated at a high output.

The negative electrode 203 includes a material capable of storing and releasing metal ions (for example, lithium ions). The material is, for example, a negative electrode active material (for example, the negative electrode active material particles 205).

Examples of the negative electrode active materials include metal materials, carbon materials, oxides, nitrides, tin compounds and silicon compounds. The metal materials may be elemental metals or alloys. Examples of the metal materials include lithium metal and lithium alloys. Examples of the carbon materials include natural graphites, cokes, semi-graphitized carbons, carbon fibers, spherical carbons, artificial graphites and amorphous carbons. From the point of view of capacitance density, for example, silicon (that is, Si), tin (that is, Sn), silicon compounds and tin compounds are preferred negative electrode active materials.

The negative electrode active material particles 205 may have a median diameter of greater than or equal to 0.1 μm and less than or equal to 100 μm. When the negative electrode active material particles 205 have a median diameter of greater than or equal to 0.1 μm, the negative electrode active material particles 205 and the solid electrolyte particles 100 may be well dispersed in the negative electrode 203. As a result, the charge/discharge characteristics of the battery are enhanced. When the negative electrode active material particles 205 have a median diameter of less than or equal to 100 μm, the lithium diffusion rate in the negative electrode active material particles 205 is enhanced. Consequently, the battery may be operated at a high output.

The negative electrode active material particles 205 may have a median diameter larger than that of the solid electrolyte particles 100. With this configuration, the negative electrode active material particles 205 and the solid electrolyte particles 100 may be well dispersed.

From the points of view of the energy density and output of the battery, the ratio of the volume of the negative electrode active material particles 205 to the total of the volume of the negative electrode active material particles 205 and the volume of the solid electrolyte particles 100 in the negative electrode 203 may be greater than or equal to 0.30 and less than or equal to 0.95.

From the points of view of the energy density and output of the battery, the negative electrode 203 may have a thickness of greater than or equal to 10 μm and less than or equal to 500 μm.

At least one selected from the group consisting of the positive electrode 201, the electrolyte layer 202 and the negative electrode 203 may include a second solid electrolyte material for the purpose of enhancing the ion conductivity, the chemical stability and the electrochemical stability.

The second solid electrolyte material may be a sulfide solid electrolyte.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$ and $Li_{10}GeP_2S_{12}$.

The second solid electrolyte material may be an oxide solid electrolyte.

Examples of the oxide solid electrolytes include:
(i) NASICON-type solid electrolytes such as $LiTi_2(PO_4)_3$ and derivatives thereof obtained by elemental substitution,
(ii) perovskite-type solid electrolytes such as $(LaLi)TiO_3$,
(iii) LISICON-type solid electrolytes such as $Li_{14}ZnGe_4O_{16}$, $Li_4SiO_4$, $LiGeO_4$ and derivatives thereof obtained by elemental substitution,
(iv) garnet-type solid electrolytes such as $Li_7La_3Zr_2O_{12}$ and derivatives thereof obtained by elemental substitution, and
(v) $Li_3PO_4$ and N-substituted derivatives thereof.

As mentioned earlier, the second solid electrolyte material may be a halide solid electrolyte. Examples of the halide solid electrolytes include $Li_2MgX'_4$, $Li_2FeX'_4$, $Li(Al, Ga, In)X'_4$, $Li_3(Al, Ga, In)X'_6$ and LiI.

Examples of the halide solid electrolyte materials further include compounds represented by $Li_pMe_qY_rZ_6$. Here, p+m'q+3r=6 and r>0. Me is at least one element selected from the group consisting of metal elements other than Li and Y and metalloid elements. Z is at least one element selected from the group consisting of F, Cl, Br and I. m' represents the valence of Me. The "metalloid elements" represent B, Si, Ge, As, Sb and Te. The "metal elements" represent all the elements in Groups 1 to 12 of the periodic table (except hydrogen) and all the elements in Groups 13 to 16 of the periodic table (except B, Si, Ge, As, Sb, Te, C, N, P, O, S and Se).

From the point of view of ion conductivity, Me may be at least one element selected from the group consisting of Mg, Ca, Sr, Ba, Zn, Sc, Al, Ga, Bi, Zr, Hf, Ti, Sn, Ta and Nb.

The second solid electrolyte material may be an organic polymer solid electrolyte.

Examples of the organic polymer solid electrolytes include polymer compounds and compounds of lithium salts. The polymer compounds may have an ethylene oxide structure. The polymer compounds having an ethylene oxide structure can contain a large amount of a lithium salt, and thus the ion conductivity may be further increased. Examples of the lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$ and $LiC(SO_2CF_3)_3$. A single kind of a lithium salt selected from these may be used singly. Alternatively, a mixture of two or more kinds of lithium salts selected from the above may be used.

At least one selected from the group consisting of the positive electrode 201, the electrolyte layer 202 and the negative electrode 203 may include a nonaqueous electrolyte solution, a gel electrolyte or an ionic liquid for the purposes of facilitating the transfer of lithium ions and enhancing the output characteristics of the battery.

The nonaqueous electrolytic solution includes a nonaqueous solvent and a lithium salt dissolved in the nonaqueous solvent. Examples of the nonaqueous solvents include cyclic carbonate ester solvents, chain carbonate ester solvents, cyclic ether solvents, chain ether solvents, cyclic ester solvents, chain ester solvents and fluorine solvents. Examples of the cyclic carbonate ester solvents include ethylene carbonate, propylene carbonate and butylene carbonate. Examples of the chain carbonate ester solvents include dimethyl carbonate, ethyl methyl carbonate and diethyl carbonate. Examples of the cyclic ether solvents include tetrahydrofuran, 1,4-dioxane and 1,3-dioxolane. Examples of the chain ether solvents include,1,2-dimethoxyethane and 1,2-diethoxyethane. Examples of the cyclic ester solvents include γ-butyrolactone. Examples of the chain ester solvents include methyl acetate, Examples of the fluorine solvents include fluoroethylene carbonate, methyl fluoropropionate, fluorobenzene, fluoroethyl methyl carbonate and fluorodimethylene carbonate. A single kind of a nonaqueous solvent selected from these may be used singly. Alternatively, a mixture of two or more kinds of nonaqueous solvents selected from the above may be used.

Examples of the lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$ and $LiC(SO_2CF_3)_3$. A single kind of a lithium salt selected from these may be used singly. Alternatively, a mixture of two or more kinds of lithium salts selected from the above may be used. The concentration of the lithium salt is, for example, greater than or equal to 0.5 mol/L and less than or equal to 2 mol/L.

The gel electrolyte may be a polymer material impregnated with a nonaqueous electrolytic solution. Examples of the polymer materials include polyethylene oxide, polyacrylonitrile, polyvinylidene fluoride, polymethyl methacrylate, and polymers having ethylene oxide bonds.

Examples of the cations contained in the ionic liquids include:
(i) aliphatic chain quaternary salts such as tetraalkyl ammoniums and tetraalkyl phosphoniums,
(ii) aliphatic cyclic ammoniums such as pyrrolidiniums, morpholiniums, imidazoliniums, tetrahydropyrimidiniums, piperaziniums and piperidiniums, and
(iii) nitrogen-containing heterocyclic aromatic cations such as pyridiniums and imidazoliums.

Examples of the anions contained in the ionic liquids include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$ and $C(SO_2CF_3)_3^-$. The ionic liquid may contain a lithium salt.

At least one selected from the group consisting of the positive electrode 201, the electrolyte layer 202 and the negative electrode 203 may include a binder for the purpose of enhancing the adhesion between the particles.

Examples of the binders include polyvinylidene fluoride, polytetrafluoroethylene, polyethylene, polypropylene, aramid resins, polyimide, polyimide, polyamidimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber and carboxymethylcellulose. Copolymers may also be used as the binders. Examples of such binders include copolymers of two or more kinds of materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid and hexadiene. A mixture of two or more kinds of materials selected from the above may be used as the binder.

At least one selected from the positive electrode 201 and the negative electrode 203 may include a conductive auxiliary for the purpose of enhancing the electron conductivity.

Examples of the conductive auxiliaries include;
(i) graphites such as natural graphites and artificial graphites,
(ii) carbon blacks such as acetylene blacks and Ketjen blacks,
(iii) conductive fibers such as carbon fibers and metal fibers,
(iv) carbon fluoride,
(v) metal powders such as aluminum, (vi) conductive whiskers such as zinc oxide and potassium titanate,
(vii) conductive metal oxides such as titanium oxide, and
(viii) conductive polymer compounds such as polyaniline, polypyrrole and polythiophene. To reduce the cost, a conductive auxiliary belonging to (i) or (ii) may be used.

Examples of the shapes of the batteries according to the second embodiment include coin shapes, cylindrical shapes, prismatic shapes, sheet shapes, button shapes, flat shapes and laminate shapes.

EXAMPLES

The present disclosure will be described in detail with reference to EXAMPLES and COMPARATIVE EXAMPLES below.

Example 1

[Preparation of Solid Electrolyte Material]

In an argon atmosphere having a dew point of less than or equal to −60° C. (hereinafter, simply written as "argon atmosphere"), LiCl, $MgCl_2$ and $AlCl_3$ as raw material powders were provided in a LiCl:$MgCl_2$:$AlCl_3$ molar ratio of 1.9:0.9:0.1. These materials were ground and mixed together in a mortar. The mixture thus obtained was milled in a planetary ball mill at 500 rpm for 12 hours.

Thus, a solid electrolyte material of EXAMPLE 1 was obtained. The solid electrolyte material of EXAMPLE 1 had a composition represented by $Li_{1.9}Mg_{0.9}Al_{0.1}Cl_4$.

[Evaluation of Ion Conductivity]

Figure 2:
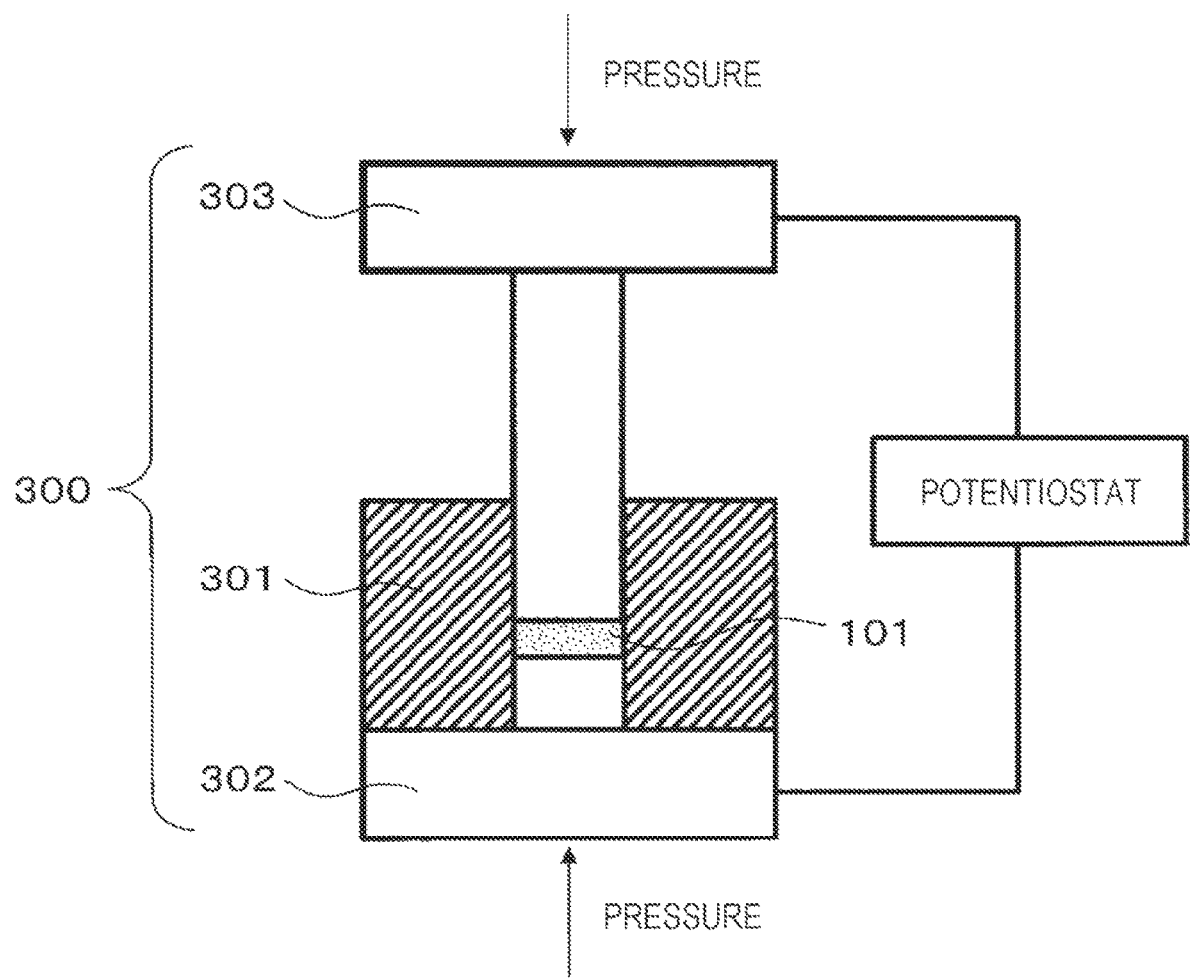
FIG. 2 illustrates a schematic view of a pressure molding die 300 used to evaluate the ion conductivity of a solid electrolyte material.

FIG. 2 illustrates a schematic view of a pressure molding die 300 used to evaluate the ion conductivity of the solid electrolyte material.

The pressure molding die 300 included a die 301, a lower punch 302 and an upper punch 303. The die 301 was formed of an insulating polycarbonate. The lower punch 302 and the upper punch 303 were each formed of electron-conductive stainless steel.

Using the pressure molding die 300 illustrated in FIG. 2, the impedance of the solid electrolyte material of EXAMPLE 1 was measured by the following method.

In an argon atmosphere, the powder of the solid electrolyte material of EXAMPLE 1 (specifically, powder 101 of the solid electrolyte material in FIG. 2) was charged to fill the inside of the pressure molding die 300. Inside the pressure molding die 300, a pressure of 400 MPa was applied to the powder of the solid electrolyte material of EXAMPLE 1 using the lower punch 302 and the upper punch 303.

While maintaining the pressure, the lower punch 302 and the upper punch 303 were connected to a potentiostat (Princeton Applied Research, Versa STAT 4) equipped with a frequency response analyzer. The upper punch 303 was connected to the working electrode and the potential measuring terminal. The lower punch 302 was connected to the counter electrode and the reference electrode. The impedance of the solid electrolyte material was measured at room temperature by an electrochemical impedance measurement method.

Figure 3:
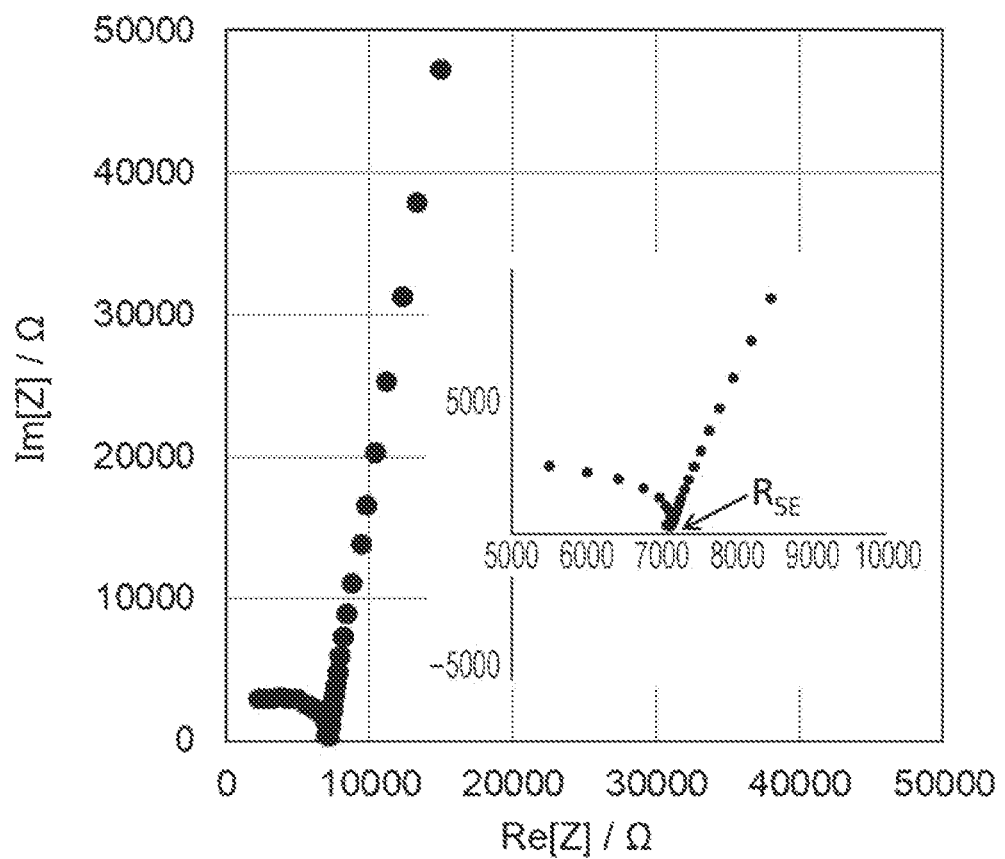
FIG. 3 is a graph illustrating a Cole-Cole diagram of the results of impedance measurement of a solid electrolyte material of EXAMPLE 1.

FIG. 3 is a graph illustrating a Cole-Cole diagram of the results of impedance measurement of the solid electrolyte material of EXAMPLE 1.

In FIG. 3, the real value of impedance at the measurement point where the absolute value of the complex impedance phase was smallest was taken as the value of resistance of the solid electrolyte material to ion conduction. For the real value, refer to the arrow $R_{SE}$ illustrated in FIG. 3.

Using the resistance value, the ion conductivity was calculated based on the following equation (2).

$$\sigma=(R_{SE} \times S/t)^{-1} \qquad (2)$$

Here, σ represents the ion conductivity. S represents the area of contact between the solid electrolyte material and the upper punch 303 (equal to the sectional area of the hollow portion of the die 301 in FIG. 2). $R_{SE}$ indicates the resistance value of the solid electrolyte material in the impedance measurement. The letter t represents the thickness of the solid electrolyte material under pressure (the thickness of the layer formed of the powder 101 of the solid electrolyte material in FIG. 2). The ion conductivity of the solid electrolyte material of EXAMPLE 1 measured at 25° C. was $6.6 \times 10^{-6}$ S/cm.

[X-Ray Diffraction Pattern]

Figure 4:
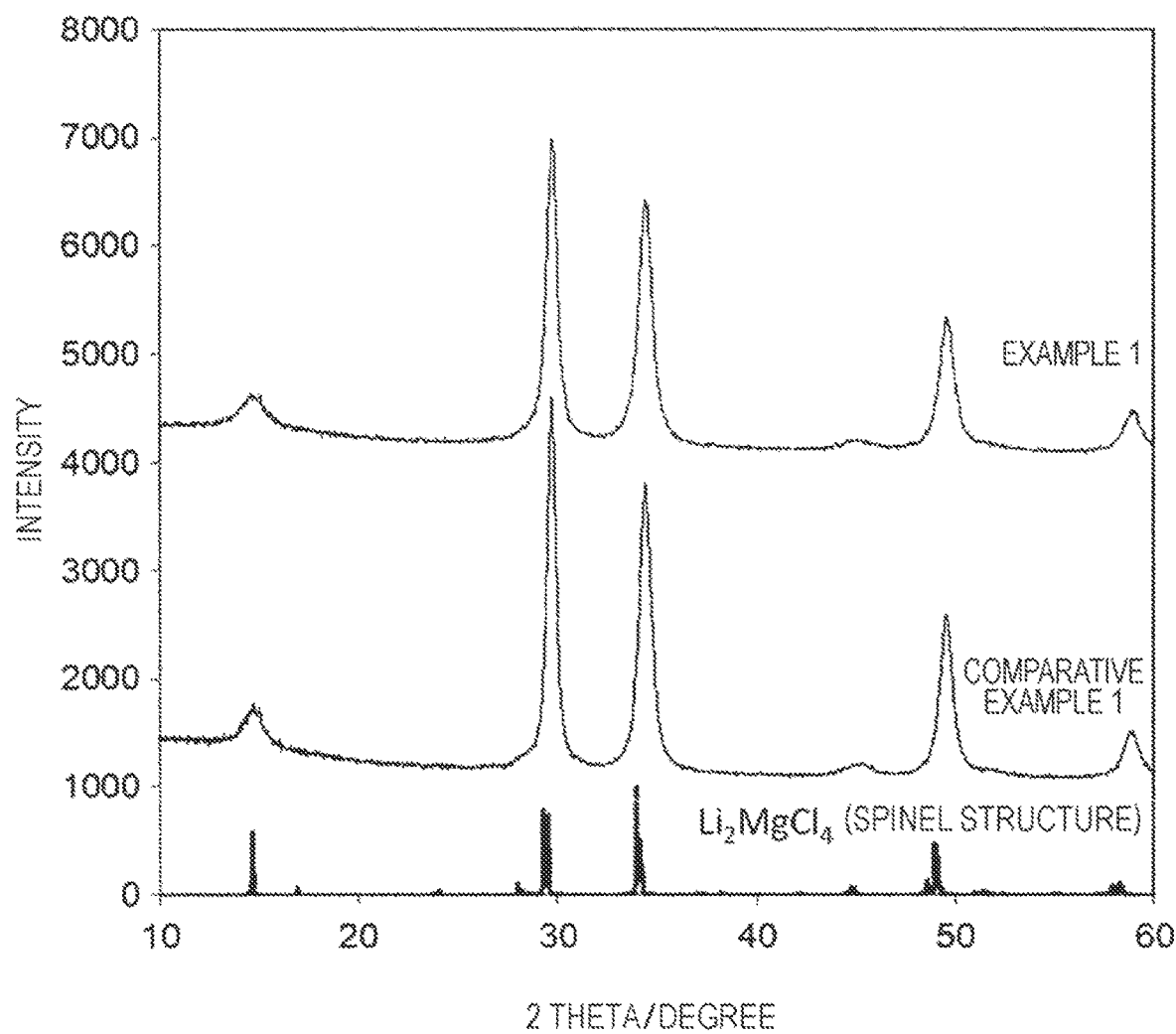
FIG. 4 is a graph illustrating X-ray diffraction patterns of solid electrolyte materials of EXAMPLE 1 and COMPARATIVE EXAMPLE 1 and an X-ray diffraction pattern of $Li_2MgCl_4$ having a spinel structure.

FIG. 4 is a graph illustrating an X-ray diffraction pattern of the solid electrolyte material of EXAMPLE 1. FIG. 4 also illustrates an X-ray diffraction pattern of $Li_2MgCl_4$ having a spinel structure. The solid electrolyte material of EXAMPLE 1 had a spinel structure. In the solid electrolyte material of EXAMPLE 1, part of Mg constituting $Li_2MgCl_4$ is substituted by Al. The X-ray diffraction pattern of the solid electrolyte material of EXAMPLE 1 showed no peaks assigned to impurities.

Examples 2 to 29

[Preparation of Solid Electrolyte Materials]

In EXAMPLES 2 to 4, LiCl, $MgCl_2$ and $AlCl_3$ as raw material powders were provided in a LiCl:$MgCl_2$:$AlCl_3$ molar ratio of (2-a):(1-a):a.

In EXAMPLE 5, EXAMPLE 26 and EXAMPLE 28, LiBr, $MgBr_2$, $MgCl_2$ and $AlCl_3$ as raw material powders were provided in a LiBr:$MgBr_2$:$MgCl_2$:$AlCl_3$ molar ratio of 1.8:0.1:0.7:0.2.

In EXAMPLE 6, LiCl, LiBr, $MgCl_2$ and $AlCl_3$ as raw material powders were provided in a LiCl:LiBr:$MgCl_2$:$AlCl_3$ molar ratio of 0.8:1.0:0.8:0.2.

In EXAMPLE 7, LiBr, $MgCl_2$, $MgBr_2$ and $AlCl_3$ as raw material powders were provided in a LiBr:$MgCl_2$:$MgBr_2$:$AlCl_3$ molar ratio of 1.8:0.2:0.6:0.2.

In EXAMPLE 8, LiBr, $MgBr_2$ and $AlBr_3$ as raw material powders were provided in a LiBr:$MgBr_2$:$AlBr_3$ molar ratio of 1.8:0.8:0.2.

In EXAMPLE 9, EXAMPLE 27 and EXAMPLE 29, LiBr, LiI, $MgCl_2$, $MgBr_2$ and $AlCl_3$ as raw material powders were provided in a LiBr:LiI:$MgCl_2$:$MgBr_2$:$AlCl_3$ molar ratio of 0.8:1.0:0.2:0.6:0.2.

In EXAMPLE 10, LiCl, $MgCl_2$ and $BiCl_3$ as raw material powders were provided in a LiCl:$MgCl_2$:$BiCl_3$ molar ratio of 1.9:0.9:0.1.

In EXAMPLE 11, LiCl, $MgCl_2$ and $YCl_3$ as raw material powders were provided in a LiCl:$MgCl_2$:$YCl_3$ molar ratio of 1.9:0.9:0.1.

In EXAMPLES 12 to 16, LiCl, $MgCl_2$ and $GaCl_3$ as raw material powders were provided in a LiCl:$MgCl_2$:$GaCl_3$ molar ratio of (2-a):(1-a):a.

In EXAMPLE 17, LiBr, $MgBr_2$, $MgCl_2$ and $GaCl_3$ as raw material powders were provided in a LiBr:$MgBr_2$:$MgCl_2$:$GaCl_3$ molar ratio of 1.8:0.1:0.7:0.1.

In EXAMPLES 18 and 19, LiCl, $MgCl_2$ and $InCl_3$ as raw material powders were provided in a LiCl:$MgCl_2$:$InCl_3$ molar ratio of (2-a):(1-a):a.

In EXAMPLES 20 to 23, LiCl, $ZnCl_2$ and $AlCl_3$ as raw material powders were provided in a LiCl:$ZnCl_2$:$AlCl_3$ molar ratio of (2-a):(1-a):a.

In EXAMPLE 24, LiCl, $MgCl_2$ and $AlCl_3$ as raw material powders were provided in a LiCl:$MgCl_2$:$AlCl_3$ molar ratio of 1.8:0.8:0.2.

In EXAMPLE 25, LiBr, $MgBr_2$ and $AlBr_3$ as raw material powders were provided in a LiBr:$MgBr_2$:$AlBr_3$ molar ratio of 1.8:0.8:0.2.

In EXAMPLES 2 to 23, solid electrolyte materials of EXAMPLES 2 to 23 were obtained in the same manner as in EXAMPLE 1 except for the above changes.

In EXAMPLES 24 to 29, samples were obtained in the same manner as in EXAMPLE 1 except for the above changes. The samples obtained were each placed into an alumina crucible in an argon atmosphere and heat-treated using an electric furnace. Solid electrolyte materials of EXAMPLES 24 to 29 were thus obtained. The heat treatment temperatures and the amounts of heat treatment time are described in Table 1.

[Evaluation of Ion Conductivity]

The ion conductivity of the solid electrolyte materials of EXAMPLES 2 to 29 was measured in the same manner as in EXAMPLE 1. The measurement results are described in Table 1.

Comparative Examples 1 to 4

[Preparation of Solid Electrolyte Materials]

In COMPARATIVE EXAMPLE 1, LiCl and $MgCl_2$ as raw material powders were provided in a LiCl:$MgCl_2$ molar ratio of 2.0:1.0.

In COMPARATIVE EXAMPLE 2, LiCl, $MgCl_2$ and $CaCl_2$ as raw material powders were provided in a LiCl:$MgCl_2$:$CaCl_2$ molar ratio of 2.0:0.9:0.1.

In COMPARATIVE EXAMPLE 3, LiCl and $ZnCl_2$ as raw material powders were provided in a LiCl:$ZnCl_2$ molar ratio of 2:1.

In COMPARATIVE EXAMPLE 4, LiCl, $ZnCl_2$ and $CaCl_2$ as raw material powders were provided in a LiCl:$ZnCl_2$:$CaCl_2$ molar ratio of 2:0.5:0.5.

[Evaluation of Ion Conductivity]

The ion conductivity of the solid electrolyte materials of COMPARATIVE EXAMPLES 1 to 4 was measured in the same manner as in EXAMPLE 1. The measurement results are described in Table 1.

[X-Ray Diffraction Pattern]

An X-ray diffraction pattern of the solid electrolyte material of COMPARATIVE EXAMPLE 1 was measured in the same manner as in EXAMPLE 1. FIG. 4 is a graph illustrating the X-ray diffraction pattern of the solid electrolyte material of COMPARATIVE EXAMPLE 1. The solid electrolyte material of COMPARATIVE EXAMPLE 1 had a spinel structure.

Table 1 describes the compositions and the evaluation results of the solid electrolyte materials of EXAMPLES 1 to 29 and COMPARATIVE EXAMPLES 1 to 4.

TABLE 1

|   | Composition | a | M1 | M2 | X | Heat treatment | Ion conductivity (S/cm) |
|---|---|---|---|---|---|---|---|
| EX.1 | $Li_{1.9}Mg_{0.9}Al_{0.1}Cl_4$ | 0.1 | Mg | Al | Cl | No | $6.6 \times 10^{-6}$ |
| EX.2 | $Li_{1.8}Mg_{0.8}Al_{0.2}Cl_4$ | 0.2 | Mg | Al | Cl | No | $4.8 \times 10^{-5}$ |
| EX.3 | $Li_{1.7}Mg_{0.7}Al_{0.3}Cl_4$ | 0.3 | Mg | Al | Cl | No | $6.7 \times 10^{-5}$ |
| EX.4 | $Li_{1.6}Mg_{0.6}Al_{0.4}Cl_4$ | 0.4 | Mg | Al | Cl | No | $5.3 \times 10^{-5}$ |
| EX.5 | $Li_{1.8}Mg_{0.8}Al_{0.2}Cl_2Br_2$ | 0.2 | Mg | Al | Cl, Br | No | $6.3 \times 10^{-5}$ |
| EX.6 | $Li_{1.8}Mg_{0.8}Al_{0.2}Cl_3Br$ | 0.2 | Mg | Al | Cl, Br | No | $3.4 \times 10^{-5}$ |
| EX.7 | $Li_{1.8}Mg_{0.8}Al_{0.2}ClBr_2$ | 0.2 | Mg | Al | Cl, Br | No | $5.7 \times 10^{-5}$ |
| EX.8 | $Li_{1.8}Mg_{0.8}Al_{0.2}Br_4$ | 0.2 | Mg | Al | Br | No | $4.6 \times 10^{-5}$ |
| EX.9 | $Li_{1.8}Mg_{0.8}Al_{0.2}Cl Br_2I$ | 0.2 | Mg | Al | Cl, Br, I | No | $8.5 \times 10^{-5}$ |
| EX.10 | $Li_{1.9}Mg_{0.9}Bi_{0.1}Cl_4$ | 0.1 | Mg | Bi | Cl | No | $1.9 \times 10^{-6}$ |
| EX.11 | $Li_{1.9}Mg_{0.9}Y_{0.1}Cl_4$ | 0.1 | Mg | Y | Cl | No | $5.1 \times 10^{-6}$ |
| EX.12 | $Li_{1.9}Mg_{0.9}Ga_{0.1}Cl_4$ | 0.1 | Mg | Ga | Cl | No | $6.2 \times 10^{-6}$ |
| EX.13 | $Li_{1.8}Mg_{0.8}Ga_{0.2}Cl_4$ | 0.2 | Mg | Ga | Cl | No | $6.2 \times 10^{-5}$ |
| EX.14 | $Li_{1.6}Mg_{0.6}Ga_{0.4}Cl_4$ | 0.3 | Mg | Ga | Cl | No | $7.2 \times 10^{-5}$ |
| EX.15 | $Li_{1.9}Mg_{0.9}Ga_{0.1}Cl_4$ | 0.4 | Mg | Ga | Cl | No | $4.6 \times 10^{-5}$ |
| EX.16 | $Li_{1.75}Mg_{0.75}Ga_{0.25}Cl_4$ | 0.25 | Mg | Ga | Cl | No | $6.7 \times 10^{-5}$ |
| EX.17 | $Li_{1.8}Mg_{0.8}Ga_{0.2}Cl_2Br_2$ | 0.2 | Mg | Ga | Cl, Br | No | $5.3 \times 10^{-5}$ |
| EX.18 | $Li_{1.9}Mg_{0.9}In_{0.1}Cl_4$ | 0.1 | Mg | In | Cl | No | $7.8 \times 10^{-6}$ |
| EX.19 | $Li_{1.8}Mg_{0.8}In_{0.2}Cl_4$ | 0.2 | Mg | In | Cl | No | $1.3 \times 10^{-5}$ |
| EX.20 | $Li_{1.9}Mg_{0.9}In_{0.1}Cl_4$ | 0.1 | Zn | Al | Cl | No | $4.8 \times 10^{-7}$ |
| EX.21 | $Li_{1.8}Mg_{0.8}In_{0.2}Cl_4$ | 0.2 | Zn | Al | Cl | No | $8.0 \times 10^{-6}$ |
| EX.22 | $Li_{1.7}Mg_{0.7}In_{0.3}Cl_4$ | 0.3 | Zn | Al | Cl | No | $2.0 \times 10^{-5}$ |
| EX.23 | $Li_{1.6}Mg_{0.6}In_{0.4}Cl_4$ | 0.4 | Zn | Al | Cl | No | $1.6 \times 10^{-5}$ |
| EX.24 | $Li_{1.6}Mg_{0.6}Al_{0.4}Cl_4$ | 0.4 | Mg | Al | Cl | 400° C., 5 h | $3.7 \times 10^{-6}$ |
| EX.25 | $Li_{1.8}Mg_{0.8}Al_{0.2}Br_4$ | 0.2 | Mg | Al | Br | 400° C., 5 h | $3.1 \times 10^{-6}$ |
| EX.26 | $Li_{1.8}Mg_{0.8}Al_{0.2}Cl_2Br_4$ | 0.2 | Mg | Al | Cl, Br | 400° C., 5 h | $1.2 \times 10^{-5}$ |
| EX.27 | $Li_{1.8}Mg_{0.8}Al_{0.2}ClBr_2I$ | 0.2 | Mg | Al | Cl, Br, I | 400° C., 5 h | $2.6 \times 10^{-5}$ |
| EX.28 | $Li_{1.8}Mg_{0.8}Al_{0.2}Cl_2Br_2$ | 0.2 | Mg | Al | Cl, Br | 150° C., 5 h | $7.7 \times 10^{-5}$ |
| EX.29 | $Li_{1.8}Mg_{0.8}Al_{0.2}ClBr_2I$ | 0.2 | Mg | Al | Cl, Br, I | 150° C., 5 h | $3.5 \times 10^{-5}$ |
| COMP. EX.1 | $Li_2MgCl_4$ | 0 | Mg | — | Cl | No | $1.0 \times 10^{-6}$ |
| COMP. EX.2 | $Li_2Mg_{0.9}Ca_{0.1}Cl_4$ | 0.1 | Mg | Al | Cl | No | $4.1 \times 10^{-7}$ |
| COMP. EX.3 | $Li_2ZnCl_4$ | 0 | Zn | — | Cl | No | $1.1 \times 10^{-8}$ |
| COMP. EX.4 | $Li_2Zn_{0.5}Ca_{0.5}Cl_4$ | 0.1 | Zn | Al | Cl | No | $1.4 \times 10^{-9}$ |

(Discussion)

The on conductivity of the solid electrolyte material of EXAMPLE 1 (namely, $Li_{1.9}Mg_{0.9}Al_{0.1}Cl_4$) was $6.6\times10^{-6}$ S/cm. On the other hand, the ion conductivity of the solid electrolyte material of COMPARATIVE EXAMPLE 1 (namely, $Li_2MgCl_4$) was $1.0\times10^{-6}$ S/cm. From these results, Li vacancies may be produced in a solid electrolyte material by designing the solid electrolyte material to include not only M1 but also M2 having a higher valence than M1. The enhancement in ion conductivity probably stems from this designing. The ion conductivity of the solid electrolyte material of COMPARATIVE EXAMPLE 2 (namely, $Li_2Mg_{0.9}Ca_{0.1}Cl_4$) was $4.1\times10^{-7}$ S/cm. The reason for this is probably because the solid electrolyte material that included M1 (namely, Mg) and Ca having the same valence as Mg had no Li vacancies, and consequently the Li diffusion was inhibited.

As clear from the comparison of EXAMPLES 2 to 4, EXAMPLES 13 to 15, and EXAMPLES 21 to 23 with EXAMPLE 1, EXAMPLE 12, and EXAMPLE 20, respectively, the lithium ion conductivity is further increased when the value of a representing the molar fraction of M2 is greater than or equal to 0.2 and less than or equal to 0.4.

The solid electrolyte materials of EXAMPLES 1 to 29 do not contain sulfur and thus do not generate hydrogen sulfide.

As described above, the solid electrolyte materials according to the present disclosure are suited for providing batteries that do not generate hydrogen sulfide and have high lithium ion conductivity.

The solid electrolyte materials according to the present disclosure are used in, for example, all-solid-state lithium ion secondary batteries.

What is claimed is:

1. A solid electrolyte material comprising Li, M1, M2 and X, wherein
    M1 is at least one element selected from the group consisting of Mg and Zn,
    M2 is at least one element selected from the group consisting of Al, Ga, Y, In and Bi,
    X is at least one element selected from the group consisting of F, Cl, Br and I, and
    the solid electrolyte material has a spinel structure.

2. The solid electrolyte material according to claim 1, which is represented by the following compositional formula (1):

$$Li_{2-a}M1_{1-a}M2_aX_4 \qquad (1)$$

wherein $0<a<1$.

3. The solid electrolyte material according to claim 2, wherein $0.1 \leq a \leq 0.4$.

4. The solid electrolyte material according to claim 3, wherein $0.2 \leq a \leq 0.4$.

5. The solid electrolyte material according to claim 1, wherein X is at least one element selected from the group consisting of Cl, Br and I.

6. A battery comprising:
    a positive electrode,
    a negative electrode, and
    an electrolyte layer disposed between the positive electrode and the negative electrode, wherein
    at least one selected from the group consisting of the positive electrode, the negative electrode and the electrolyte layer comprises the solid electrolyte material described in claim 1.

* * * * *